Figure 1:
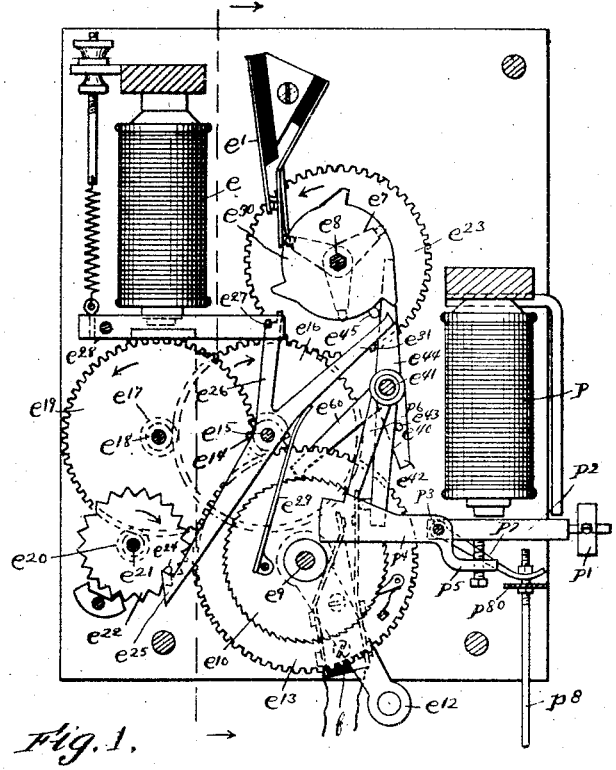

F. W. COLE.
WATCHMAN'S SIGNAL SYSTEM.
APPLICATION FILED APR. 15, 1910.

1,058,726.

Patented Apr. 15, 1913.
4 SHEETS—SHEET 1.

Witnesses:
H. B. Davis.
J. R. Boyle.

Inventor:
Frederick W. Cole
by Hayes Harriman
attys.

F. W. COLE.
WATCHMAN'S SIGNAL SYSTEM.
APPLICATION FILED APR. 15, 1910.

1,058,726.

Patented Apr. 15, 1913.
4 SHEETS—SHEET 2.

Witnesses:
H. B. Davis
B. A. Boyle

Inventor:
Frederick W. Cole
by Noyes & Harriman
attys

F. W. COLE.
WATCHMAN'S SIGNAL SYSTEM.
APPLICATION FILED APR. 15, 1910.

1,058,726.

Patented Apr. 15, 1913.
4 SHEETS—SHEET 3.

Witnesses:
H. B. Davis.
H. A. Boyle.

Inventor:
Frederick W. Cole
by Noyes Harriman
Atty.

UNITED STATES PATENT OFFICE.

FREDERICK W. COLE, OF NEWTON, MASSACHUSETTS, ASSIGNOR TO THE GAMEWELL FIRE ALARM TELEGRAPH COMPANY, OF NEW YORK, N. Y., A CORPORATION OF NEW YORK.

WATCHMAN'S SIGNAL SYSTEM.

1,058,726.   Specification of Letters Patent.   Patented Apr. 15, 1913.

Application filed April 15, 1910. Serial No. 555,603.

*To all whom it may concern:*

Be it known that I, FREDERICK W. COLE, of Newton, in the county of Middlesex and State of Massachusetts, have invented an Improvement in Watchmen's Signal Systems, of which the following is a specification.

This invention relates to a supervisory signal-system for watchmen, and has for its object to provide means for sending signals from signal-stations, which will be recorded locally, showing the stations operated and the time of their operation; also to provide means for necessitating the watchman visiting the signal-stations in a prescribed order; and also to provide means, adapted to be controlled or operated by the signaling-devices at the signal-stations for sending a signal to a supervisory-station when the signaling-devices of all the signal-stations have been operated by a watchman going his round, such signal being an "on-duty" signal and indicating that the signal-stations have all been properly visited; also to provide testing-means for the circuit and battery, which is included therein, which is adapted to control the operation of the means for sending a signal to the supervisory-station. The signal-stations are arranged throughout the building, yard, or other property to be protected, and have signaling-devices adapted to be operated by a watchman going his round. As a means for locally recording the signals a watch-clock of ordinary construction may be employed, which not only records the signals but also the time of their reception. Code-signal transmitting means are employed for sending signals, such, for instance, as a code identification number, to the supervisory-station. Suitable apparatus is provided adapted to be operated by the signaling-devices at the signal-stations for controlling the operation of the code-signal transmitting means, whereby a signal will only be sent to the supervisory-station when the signaling-devices of all of the signal-stations have been operated, and said apparatus includes means for controlling its own operation, which necessitates the watchman visiting the signal-stations in a prescribed order, in order that said apparatus shall be properly operated. A testing-magnet is provided in the circuit, the armature of which is also adapted to control the operation of the code-signal transmitter, whereby a different signal may be sent to the supervisory-station in case the current becomes weakened or the circuit is rendered inoperative. At the supervisory-station inspectors are in attendance to be sent to the supervised building when necessary.

Many buildings equipped with this system may be connected with a single supervisory-station, each building having code-signal transmitting means, and, if desired, the code-signal transmitting means of the several buildings may be connected in the same circuit which is connected with the supervisory-station.

Figure 2:
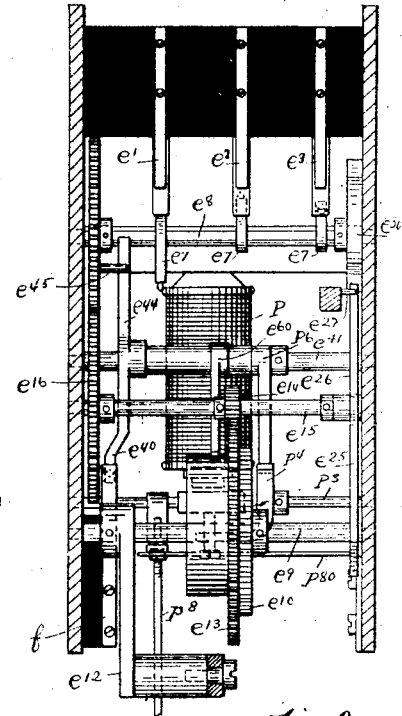
Figure 3:
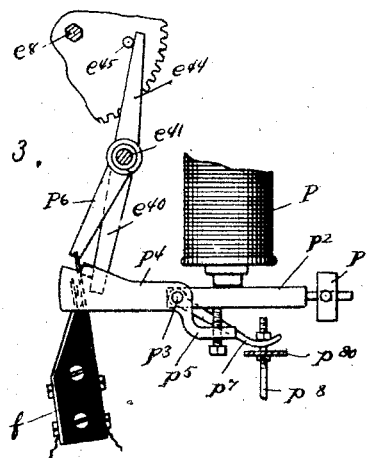
Figure 4:
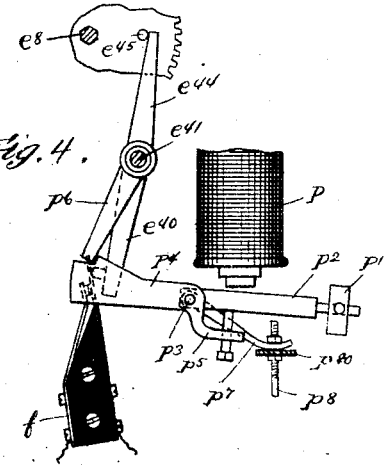
Figure 8:
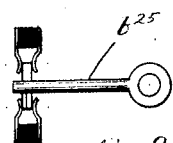
Figure 5:
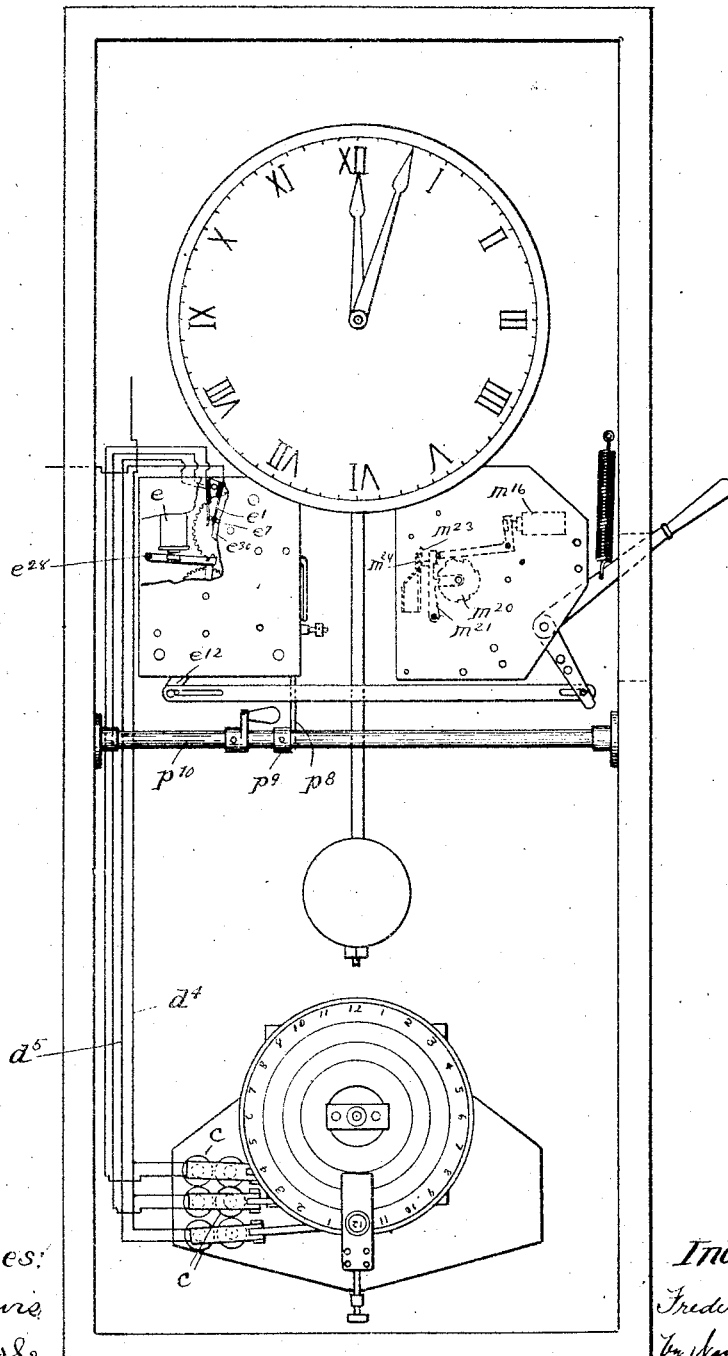
Figure 6:
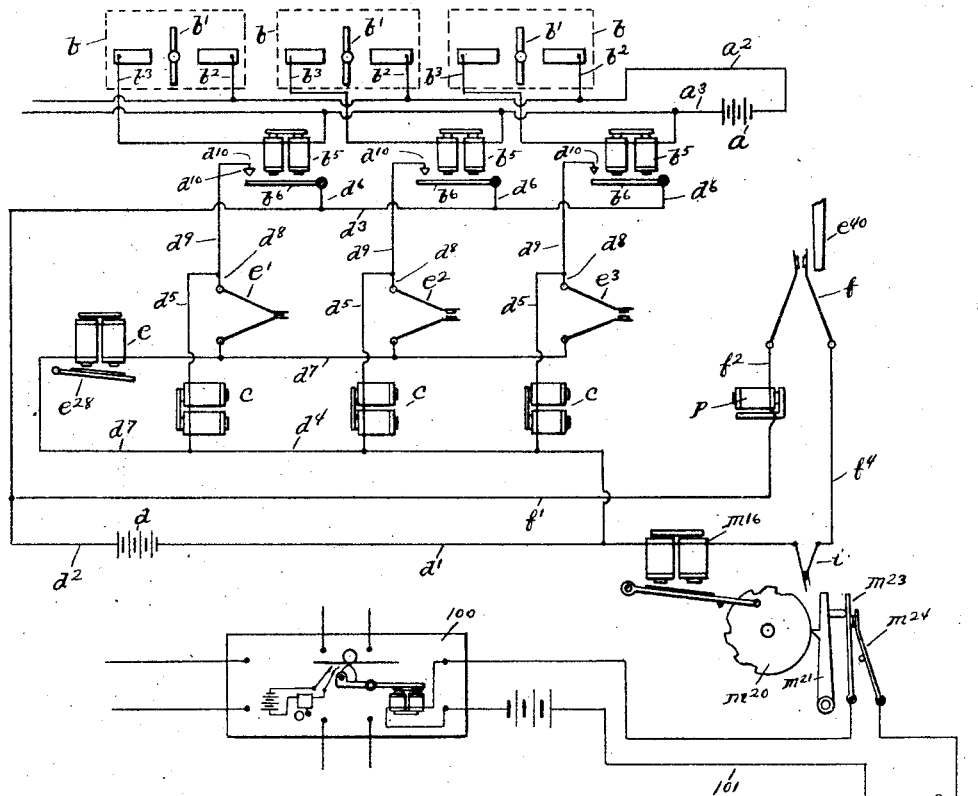
Figure 7:
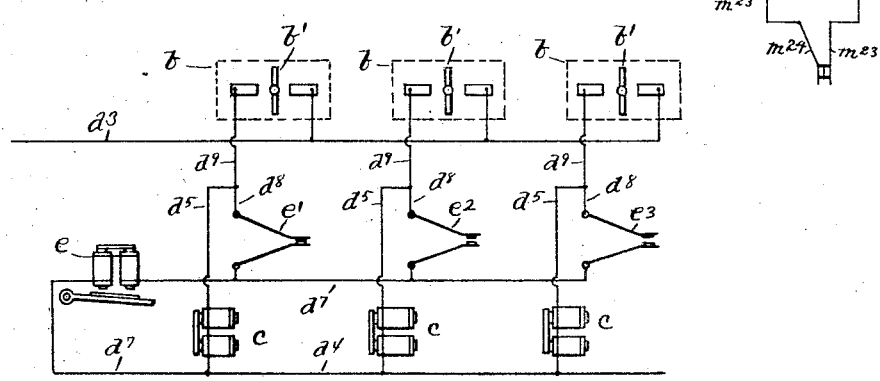
Figure 9:
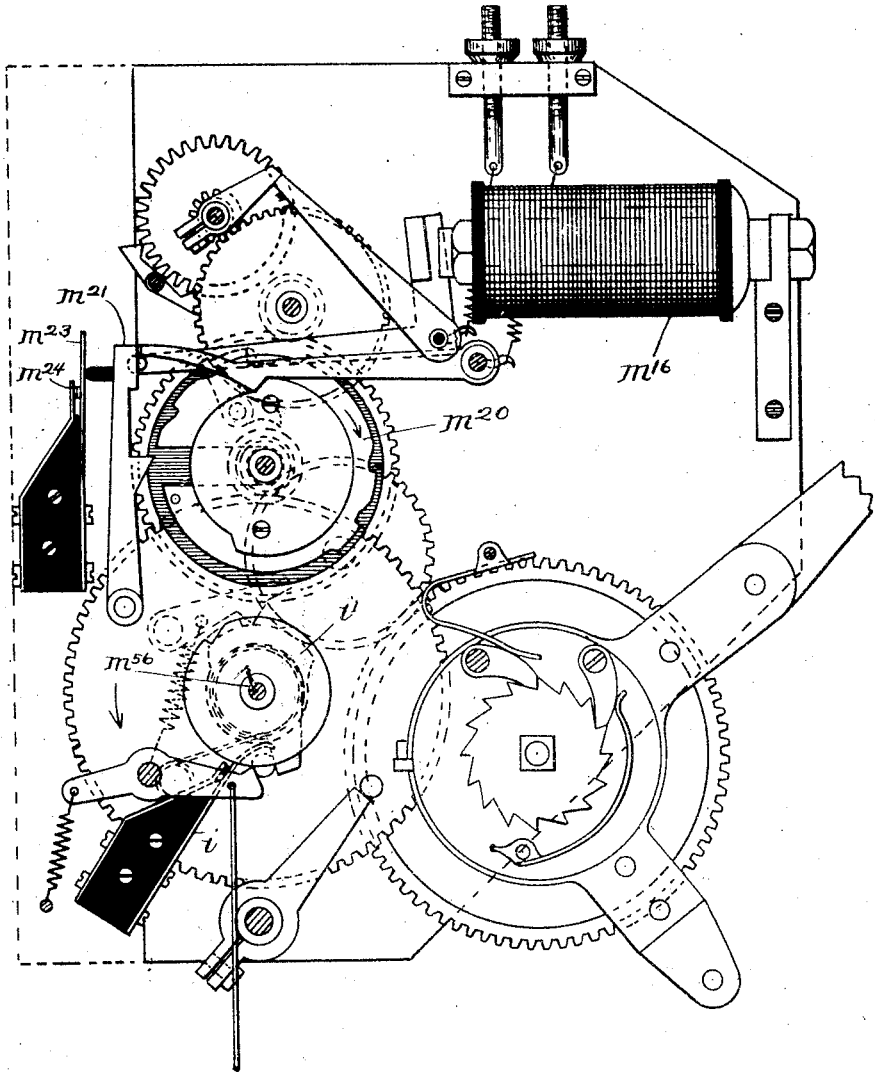

Figure 1 is a front view of an apparatus adapted to be operated by the signaling-devices at the signal-stations for controlling the operation of code-signal transmitting means to send signals to a supervisory-station, when the signaling-devices of all the stations have been operated, said apparatus also having means for controlling its own operation which necessitates the operation of the several signaling-devices in a prescribed order. Fig. 2 is a side view of the apparatus shown in Fig. 1. Figs. 3 and 4 are details of the means for operating the circuit-controlling device for the circuit of the starting-magnet of the code-signal transmitter. Fig. 5 is a front view of a portion of a local signal-recorder which may be employed and the apparatus shown in Fig. 1 and the code-signal transmitting means. Fig. 6 is a diagram of one form of circuit which may be employed. Fig. 7 is a modification of a part of the circuit, to be referred to. Fig. 8 is a detail view of a watchman's key which may be employed. Fig. 9 is a front view of a portion of a code-signal transmitter which may be employed.

Throughout the building, yard, or other property to be protected, signal-stations $b$ are arranged, see diagram, Fig. 6. At each signal-station a signaling-device, shown as a circuit-closer $b'$, of any suitable construction, is provided, adapted to be operated manually; as, for instance, by a watchman's key, $b^{25}$, see Fig. 8, which will be carried by the watchman and which is constructed to engage and connect a pair of clips which are connected respectively with the circuit-wires $b^2$, $b^3$, to thereby connect the main circuit-wires $a^2$, $a^3$, at opposite sides of the battery $a$ and close the circuit. In the branch circuit-wires $b^3$ relays $b^5$ are included, there being one relay for each signaling-device $b'$, and, as the main circuit is normally open, the armatures $b^6$ of the relays are normally retracted. Said relays control the operation of a local signal-recorder, and also apparatus which is employed to control the starting of the code-signal transmitting-means to send a signal to the supervisory-station. It will be understood, however, that the employment of said relays is not important, for in Fig. 7 a circuit is shown wherein said relays are omitted.

The local signal-recorder which I prefer to employ is here shown as a watch-clock, and as said clock is of well known construction, a detailed description of the same is not deemed necessary.

Referring to Fig. 5, $c$ represents the operating-magnets of the local signal-recorder, which correspond in number to the number of signal-stations. They are included in branch circuit-wires $d^5$ of a local-circuit, and arranged to be operated by the armatures of the several relays $b^5$. Said branch circuit-wires $d^5$ all lead from a circuit-wire $d^4$, which is connected with a circuit-wire $d'$, leading from one side of the battery $d$. A circuit-wire $d^2$ leads from the other side of said battery to a circuit-wire $d^3$, from which circuit-wires $d^6$ lead to the armatures $b^6$ of the relays. The armatures of the relays, when moved into attracted position, engage contact-points $d^{10}$, and said contact-points are respectively connected by circuit-wires $d^9$ with the circuit-wires $d^5$. When the armature of a relay is moved into its attracted position, in response to the operation of its corresponding signaling-device, the circuit is closed as follows: battery $d$, circuit-wires $d'$, $d^4$, $d^5$, $d^9$, contact-point $d^{10}$, armature $b^6$, circuit-wires $d^6$, $d^3$, $d^2$; and one of the operating-magnets $c$, which is included in the branch circuit-wire $d^5$, which is at such time closed, is caused to operate, and a signal is recorded on the dial of the watch-clock and also the time of its reception, in the manner usual in watch-clocks.

The code-signal transmitting means is arranged to send signals over a supervisory-circuit 101, from the building under supervision to the supervisory-station 100. Said circuit 101, while here shown as a separate circuit, may be constructed so that the locals are branches of it or divisions or a split of the circuit bridged by resistance in a manner well known to electricians, so that all of the circuits of the system might be charged from the same source of energy. In such case the circuits would be separate, so far as their operation is concerned, and would be considered as the equivalent of the separate circuits herein referred to. The code-signal transmitting means may be of any suitable construction, so far as my present invention is concerned, although the code-signal transmitting apparatus shown in my application for Letters Patent, Serial Number 555,605, filed April 15, 1910, is especially applicable for the reason that it is designed to be released by an electro-magnet and also to transmit more than one signal, and to transmit differentiating signal-impulses in connection with some signals, whereby an audible alarm is caused to respond. Referring to Fig. 9, wherein a sufficient portion of the code-signal transmitter of said application is shown for illustration, $m^{20}$ represents the signal-wheel of the code-signal transmitting-means which is adapted to operate a signal-key $m^{21}$, to in turn operate a pair of contact-pens $m^{23}$, $m^{24}$, and control the supervisory-circuit 101, and send over said circuit to a recorder at the supervisory-station code-signals such, for instance, as the identification number of the building one or more times sent. The identification number transmitted once constitutes a signal which indicates that all of the signal-stations have been properly visited, and, the identification number transmitted several times, constitutes a signal which indicates trouble of some sort, and, as here shown, indicates that one of the batteries, as the battery $d$, for instance, has become too weak, or that the circuit of said battery is out of order; as, for instance, that it is broken. Said "trouble" signal is accompanied by a differentiating signal-impulse whereby a bell is caused to respond. Said code-signal transmitting means is adapted to be electrically started and controlled, and, for such purpose, a starting-magnet $m^{16}$ is provided for releasing or otherwise operating it, and for also controlling its operation to cause the different signals to be sent. Said starting-magnet $m^{16}$ is included in a branch circuit-wire $f^4$, leading from the circuit-wire $d'$, and a circuit controlling-device $f$ is connected in said branch circuit-wire for controlling the circuit of said starting-magnet, and a circuit-wire $f^2$ leads from said circuit-controlling device $f$ to the circuit-wire $f'$, which is connected to the circuit-wire $d^2$. The circuit of the starting-magnet is therefore as follows: battery $d$, circuit-wire $d'$, starting-magnet $m^{16}$, circuit-wire $f^4$, circuit-controlling device $f$, circuit-wires $f^2$, $f'$, $d^2$, to battery. The circuit-controlling device $f$ is normally open, and, when closed, the starting-magnet $m^{16}$ is energized. If said circuit-controlling device is closed momentarily, the starting-magnet $m^{16}$ will be energized to release the code-signal transmitting-means and immediately resume its normal condition, and, in such case, the signal-transmitting means will operate to send the identification number once as by one round of the signal wheel $m^{20}$; but, if said circuit-controlling device is closed for a long period of time, or until re-set, then the code-signal transmitting-means will be released and will continue to operate until arrested by the opening of the circuit of the starting-magnet $m^{16}$, which, as here shown, is accomplished by opening a switch $i$, which is included in said circuit, see Fig. 6, and which is adapted to be operated by the code-signal transmitting-means as for instance, by the disk $i'$ secured to the shaft $m^{56}$, see Fig. 9, in the manner shown in my said application.

For the transmission of the "on-duty" signal the circuit-controlling device $f$ is designed to be operated momentarily, and is adapted to be operated when, but not until, the signaling-devices of all the signal-stations have been operated, preferably in a prescribed order, and hence mechanism is provided for the accomplishment of this result. Referring to Figs. 1 and 2, $e$ represents the controlling-magnet for this mechanism, and $e'$, $e^2$, $e^3$, a series of switches, corresponding in number to the number of signal-stations and herein referred to as route-switches. Said switches are arranged in separate branches of the circuit which branches are controlled respectively by the several signaling-devices $b'$, and the controlling-magnet $e$ is arranged in a branch circuit-wire common to all said branches, whereby it may be arranged in series with any one of said switches. As shown in Fig. 6 the several switches are included in branch circuit-wires $d^8$, $d^9$, all leading from the branch circuit-wire $d^7$, and said circuit-wire $d^7$ is common to all said circuit-wires $d^8$, $d^9$, and contains the controlling-magnet $e$, and said branch-circuits $d^8$, $d^9$, respectively extend to the contacts $d^{10}$, which the armatures $b^6$ of relays $b^5$ are adapted to engage. The circuit containing the route-switches is as follows: battery $d$, circuit-wires $d'$, $d^4$, $d^7$, including the controlling-magnet $e$, circuit-wires $d^3$, $d^9$, contact $d^{10}$, armature $b^6$, circuit-wires $d^6$, $d^5$, $d^2$, to battery. Some one of the switches of the group is normally closed and the others are normally open, and the controlling-magnet is normally arranged in series with the closed switch, to respond to the operation of the particular signaling-device which controls the branch-circuit containing the closed switch; and it is designed that the switches shall be successively operated by means controlled by the controlling-magnet to place said controlling-magnet successively under the control of the several signaling-devices and to thereby require the watchman to visit the several signal-stations in a prescribed order; that is to say, as the closed switch is opened, the next succeeding switch will be closed, and so on throughout the entire group, and the controlling-magnet is therefore successively arranged in series with the switches, which are closed, being thereby placed successively under the control of the several signal-stations. For the purpose of operating the several switches *seriatim*, as above described, a series of fingers $e^7$, one for each switch, extend radially in different directions from a shaft $e^8$, and said fingers are arranged to engage the switches as the shaft revolves. Said shaft is designed to be revolved intermittingly to cause the fingers to successively engage the switches. Said shaft is normally at rest with one of its fingers in engagement with one of the switches to thereby hold one of the switches closed, and, as the shaft is moved, said finger disengages said switch, and the next finger engages its switch, and so on during the entire revolution of the shaft. A normally wound train is employed for revolving the shaft intermittingly, which is adapted to be released by the controlling-magnet $e$, each time said magnet is energized. Said magnet, however, can only be energized by the operation of a signaling-device which controls the branch circuit-wire containing the closed switch, in series with which said controlling-magnet is arranged.

The switch-operating train comprises a winding-shaft $e^9$, bearing a ratchet-wheel $e^{10}$, and a winding-arm $e^{12}$ for turning it, a spur-gear $e^{13}$ bearing a pawl, which is engaged by said ratchet-wheel, whereby said gear is driven by the revolving ratchet-wheel, a pinion $e^{14}$ engaged by said gear $e^{13}$ secured to a shaft $e^{15}$, bearing a spur-gear $e^{16}$, which engages a pinion $e^{17}$, secured to a shaft $e^{18}$, bearing a spur-gear $e^{19}$, which engages a pinion $e^{20}$, secured to a shaft $e^{21}$, bearing an escape-wheel $e^{22}$, which is engaged by a suitable regulating pallet. The spur-gear $e^{16}$ also engages a like spur-gear $e^{23}$, secured to the shaft $e^8$. The escape-wheel has a pin $e^{24}$, projecting from its side, which is normally engaged by a detent-lever $e^{25}$, loosely mounted for convenience on the shaft $e^{15}$, and said detent-lever has an upwardly-extended arm $e^{26}$, having a shouldered end which is in coöperative engagement with a pin $e^{27}$ on the armature $e^{28}$ of the controlling-magnet $e$. Whenever said armature is moved into its attracted position the pin $e^{27}$ is raised to permit the detent-lever to be moved by a spring $e^{29}$ a short distance to in turn release the train. The train having been released, the shaft $e^8$ is turned, and, as soon as one of the fingers disengages the closed switch, the branch-circuit containing said switch and also the controlling-magnet $e$ is opened, and the armature of the controlling-magnet is permitted to retract, preparatory to again engaging the detent-lever to stop the train. The detent-lever is subsequently restored by means controlled or operated by the train; as, for instance, a toothed-wheel $e^{30}$ is fixed to the shaft $e^8$, and an arm $e^{31}$ is connected with the detent-lever, which, when said detent-lever is moved to release the train, is moved into the path of movement of the teeth of said wheel $e^{30}$, so that it will be struck by one of said teeth as the wheel revolves, and thereby moved to in turn restore the detent-lever into position to be engaged by the retracted armature of the controlling-magnet and stop the train. The teeth on the wheel $e^{30}$ correspond in number to the number of switches, and they are arranged at equal distances apart, and so disposed as to engage the arm $e^{31}$ and restore the detent-lever when the shaft $e^8$ has moved one step; that is to say, after the shaft $e^8$ is revolved far enough to open the closed switch and close the next switch. As there are as many switches as signal-stations, and as they are all arranged so as to be successively operated by the several fingers $e^7$ as the shaft $e^8$ intermittingly revolves, and, as the controlling-magnet $e$ can only respond when the signal-station operated corresponds to the switch then closed, and as the train only moves one step at each operation of a signaling-device, it will be seen that upon each complete revolution of said shaft $e^8$, all the switches will have been operated, in a prescribed order, by reason of all the signal-stations having been visited by the watchman. When all of the route-switches $e'$, etc., have been thus operated *seriatim*, the intermittingly-movable route-switch mechanism will have completed a cycle of its operation, and, at such time, the circuit-controlling device $f$ is designed to be operated. To accomplish this result an arm $e^{40}$, loosely mounted on a pivot-shaft $e^{41}$, is arranged to engage said circuit-controlling device $f$, and an arm $e^{44}$ is connected with said arm $e^{40}$, and extends into the path of movement of a pin $e^{45}$, arranged on the gear-wheel $e^{23}$, or other movable part of the train, at such point thereon as to engage said arm $e^{44}$ when the shaft $e^8$ is moved the last step of a complete revolution, which may be at the same time that the last switch of the series is opened, and the first switch of the series is closed. When the pin $e^{45}$ engages and moves said arm $e^{44}$ the circuit-controlling device $f$ will be closed to cause energization of the starting-magnet $m^{16}$ of the supervisory code-signal transmitter. The movement of the gear-wheel $e^{23}$, bearing the pin $e^{45}$, in making one step, is sufficient for said pin to not only engage and move said arm, but also to pass by said arm and thereby disengage it, permitting said arm to resume its normal position, and, as the arm thus resumes its normal position, the circuit-controlling device $f$ will be again opened before the mechanism stops. Said circuit-controlling device $f$ is thus closed momentarily, so that the circuit of the starting-magnet $m^{16}$ will be closed momentarily, to merely release the signal-transmitter, to permit it to operate and send its "on-duty" signal. In case the watchman did not follow the prescribed order, or in case the route-switch mechanism or the switches themselves should fail to operate, the signals sent by the watchman would still be recorded on the local signal-recorder, so that errors or troubles could be determined and located.

It will be observed that the circuit of the starting-magnet $m^{16}$ is normally open, and, for the purpose of automatically testing said circuit, and particularly the battery $d$ included therein, at frequent intervals, means are herein provided whereby a test is made upon each operation of the circuit-controlling device $f$, so that each time the circuit is closed, as, for instance, when an "on-duty" signal is sent, the strength of the current is tested, and such test also applies in case the circuit is open somewhere at the moment the circuit-controlling device $f$ is closed. As here shown, see Figs. 1 to 6, $p$ represents an electro-magnet which is included in a circuit-wire $f^2$, in series with the circuit-controlling device $f$, so that when said circuit-controlling device is operated to close the circuit of the starting-magnet $m^{16}$, said testing-magnet $p$ will be included, and, if the battery-current is of the requisite strength, or if the current is in working condition, it will be properly energized so as to hold up its armature in attracted position; but otherwise said magnet will be but slightly energized or wholly deënergized; and hence will not hold up its armature.

$p^2$ represents the armature of the testing-magnet $p$. It is loosely mounted on a shaft $p^3$, and has an extension on which is adjustably mounted a retractile-weight $p'$. A supporting-lever for the armature is secured to the shaft $p^3$, having a portion $p^5$ extended beneath the armature $p^2$, through which passes an adjusting-screw which engages the armature. Said supporting-lever also has a portion $p^4$, which normally engages or rests against the end of an arm $p^6$, see Fig. 1, mounted on the pivot shaft $e^{41}$, and connected with the arm $e^{40}$ and by said arm $p^6$, said lever is normally held in position to hold the armature $p^2$ in its normal attracted position. The portion $p^4$ of said supporting-lever has a notch at its end, in front of the point of engagement with the end of the arm $p^6$, and, when said arm $p^6$ is moved, as it will be when the arm $e^{40}$ is moved to close the circuit-controlling device $f$, then its end will pass over the notched part of the portion $p^4$. At this moment, if the battery-current is of the requisite strength, the testing-magnet $p$ will be energized sufficiently to hold its armature $p^2$ in its normal attracted position when released by the aforesaid movement of the arm $p^6$, see Fig. 3; but, if not of the requisite strength, or the circuit is broken, then said armature will be moved into its retracted position, see Fig. 4, raising the portion $p^4$ of the supporting-lever, so that its notched end portion will engage the arm $p^6$, while the latter is in its abnormal position; and the shoulder of the notch will thereby lock said arm $p^6$ from returning to normal position, and the contacts $f$ thereby kept closed until the armature and supporting-lever have been manually restored. An arm $p^7$ is secured to the pivot-shaft $p^3$, to which the supporting-lever is fastened, and extends into the path of movement of a flat restoring-spring $p^{80}$ which is secured to the frame. A movable end of said spring is connected by a link $p^8$ with an arm $p^9$ secured to a rock-shaft $p^{10}$ which may be manually turned to positively raise the link and allow the spring to restore the armature and supporting-lever. The rock-shaft will have a restoring-spring which is greater than the force of the flat spring of the armature. As the arm $p^6$ is connected with the arm $e^{40}$, it will be observed that, when said arm $p^6$ is held by the supporting-lever $p^4$, said arm $e^{40}$ will act to hold the circuit-controlling device $f$ closed, and such closure of the circuit-controlling device $f$ will operate to hold the starting-magnet $m^{16}$ energized until the circuit of said magnet is opened by the opening of the switch $i$, see Fig. 6. Thus, notwithstanding the circuit of the starting-magnet $m^{16}$ is normally open, it is frequently tested, and, in case of trouble, a signal indicating such fact will be sent to the supervisory-station by a transmitter which controls the switch $i$.

Means are here provided for sending a trouble signal to the supervisory-station in case the main-spring of the route-switch mechanism should break or unduly unwind, and such means, as here shown, consists of an arm $e^{60}$ connected to the arm $e^{40}$. Said arm $e^{60}$ normally occupies a position in the path of excessive expansion of the main-spring, and, in case said spring should break, it will immediately expand and engage and move said arm $e^{60}$, causing the arm $e^{40}$ to close and hold closed the circuit-controlling device $f$, to thereby operate the starting-magnet $m^{16}$ in the manner previously described, in connection with the testing-magnet. The same signal will therefore be sent to the supervisory-station, in case the main-spring breaks or unduly unwinds, as is sent in case of trouble with the circuit or battery contained therein.

The apparatus here shown is of especial advantage in connection with supervisory signal-systems, such for instance as shown in my applications for Letters Patent #555,601 and #555,604, filed April 15, 1910.

I claim:—

1. In a watchman's signal-system, the combination of a signaling-circuit connected with a central-station, a code-signal-transmitter arranged to send signals over said circuit, starting-means for said transmitter, another circuit having signaling-devices at signal-stations, and means, operated by each signaling-device, arranged to operate said starting-means when all said signaling-devices have been operated, substantially as described.

2. In a watchman's signal-system, the combination of a signaling-circuit connected with a central-station, a code-signal-transmitter arranged to send signals over said circuit, a starting-device for said transmitter, controlling-means for said starting-device, another circuit having signaling-devices at signal-stations, and means, operated by each signaling-device, arranged to operate said controlling-means when all of said signaling-devices have been operated, substantially as described.

3. In a watchman's signal-system, the combination of a signaling-circuit connected with a central-station, a code-signal-transmitter arranged to send signals over said circuit, having a starting-magnet, another circuit having signaling-devices at signal-stations, and means operated by each signaling-device arranged to control the circuit of said starting-magnet when all of said signaling-devices have been operated, substantially as described.

4. In a watchman's signal-system, the combination of a signaling-circuit connected with a central-station, a code-signal-transmitter for sending signals over said circuit, having a starting-magnet, a local circuit-controlling device for the circuit of said starting-magnet, another circuit having signaling-devices at signal-stations, and means, controlled by each signaling-device arranged to operate said local circuit-controlling device when all of said signaling-devices have been operated, substantially as described.

5. In a watchman's signal-system, the combination of a signaling-circuit connected with a central-station, a code-signal-transmitter for sending signals over said circuit, having a starting-magnet, a local circuit-controlling device for the circuit of said starting-magnet, another circuit having signaling-devices at signal-stations, an intermittingly-movable member adapted to operate said local circuit-controlling device, and means, controlled by the several signaling-devices, to move said member intermittingly, substantially as described.

6. In a watchman's signal-system, the combination of a signaling-circuit connected with a central-station, a code-signal-transmitter arranged to send signals over said circuit, having a starting-device, another circuit having signaling-devices at signal-stations, an intermittingly-movable member adapted to control the operation of said starting-device to start said transmitter, and means, operated by the several signaling-devices, arranged to move said member intermittingly and to operate said starting-device when all said signaling-devices have been operated, substantially as described.

7. In a watchman's signal-system, the combination of a signaling-circuit connected with a central-station, a code-signal-transmitter arranged to send signals over said circuit having a starting-device, another circuit having signaling-devices at signal-stations, a rotatable-member adapted to operate said starting-device on each complete cycle of its operation, an operating-magnet for said rotatable member, and means operated by said rotatable-member arranged to place said operating-magnet successively under the control of the several signaling-devices, substantially as described.

8. In a watchman's signal-system, the combination of a signaling-circuit connected with a central-station, a code-signal-transmitter arranged to send signals over said circuit, having a starting-device, another circuit having signaling-devices at signal-stations, an intermittingly-rotatable member adapted to operate said starting-device on each complete cycle of its operation, an operating-magnet for said rotatable-member, and means operated by said rotatable-member arranged to place said operating-magnet successively under the control of the several signaling-devices, substantially as described.

9. In a watchman's signal-system, the combination of a signaling-circuit connected with a central-station, a code-signal-transmitter arranged to send signals over said circuit, having a starting-device, another circuit having signaling-devices at signal-stations, an intermittingly-rotatable member adapted to operate said starting-device on each complete cycle of its operation, an operating-magnet for said rotatable-member, controlled by said signaling-devices, a plurality of switches corresponding in number to the number of signal-stations, and means, operated by said rotatable-member, arranged to successively operate said switches to place said operating-magnet successively under the control of the several signaling-devices, substantially as described.

10. In a watchman's signal-system, the combination of a signaling-circuit connected with a central-station, a code-signal-transmitter arranged to send signals over said circuit, having a starting-device, another circuit having signaling-devices at signal-stations, an intermittingly-rotatable member adapted to operate said starting-device on each complete cycle of its operation, a normally-wound train for rotating said member having a detent-lever for arresting it, a magnet for operating said detent-lever to release said train, and means, operated by said rotatable-member, arranged to successively place said magnet under the control of the several signaling-devices, substantially as described.

11. In a watchman's signal-system, the combination of a signaling-circuit connected with a central-station, a code-signal-transmitter arranged to send signals over said circuit, having a starting-device, another circuit having signaling-devices at signal-stations, an intermittingly-rotatable member adapted to operate said starting-device on each complete cycle of its operation, a normally-wound train for rotating said member, having a detent-lever for arresting it, a magnet arranged to move said detent-lever to release said train, means, operated by said rotatable-member, arranged to successively place said magnet under the control of the several signaling-devices, and means, operated by the train, arranged to restore said detent-lever, to arrest the train at the end of each operation, substantially as described.

12. In a watchman's signal-system, the combination of a signaling-circuit connected with a central-station, a code-signal transmitter arranged to send signals over said circuit having a starting-magnet, a local circuit-controlling device for the circuit of said starting-magnet, another circuit having signaling-devices at signal-stations, an intermittingly-movable rotatable-member adapted to operate said local circuit-controlling device on each complete cycle of its operation, a operating-magnet for said rotatable-member, and means, operated by said rotatable-member, arranged to successively place said magnet under the control of the several signaling-devices, substantially as described.

13. In a watchman's signal-system, the combination of a signaling-circuit connected with a central-station, a code-signal transmitter arranged to send signals over said circuit, having a starting-magnet, another circuit having signaling-devices at signal-stations, an intermittingly-rotatable member adapted to operate said starting-device on the completion of a cycle of its operation, step-by-step actuating means for said rotatable-member, an operating-magnet therefor, and means, operated by said step-by-step actuating means, arranged to successively place said operating-magnet under the control of the several signaling-devices, substantially as described.

14. In a watchman's signal-system, the combination of a signaling-circuit connected with a central-station, a code-signal-transmitter arranged to send signals over said circuit, having a starting-device, another circuit having signaling-devices at signal-stations, an intermittingly-rotatable member adapted to operate said starting-device at the completion of a cycle of its operation, step-by-step actuating-means for said rotatable-member, an operating-magnet therefor, radially extended arms borne by said rotatable member, a plurality of switches arranged to be engaged successively by said arms as the member bearing them rotates and operating to place said operating-magnet successively under the control of the several signaling-devices, substantially as described.

15. In a watchman's signal-system, the combination of a signaling-circuit connected with a central-station, a code-signal transmitter arranged to send signals over said circuit, starting-means for said transmitter, another circuit having signaling-devices at signal-stations, a switch-operating magnet adapted to be operated by all said signaling-devices, a plurality of switches controlled by said switch-operating magnet arranged to include said switch-operating magnet in circuit successively with the several signal-stations, in a prescribed order, and means, also controlled by said switch-operating magnet, arranged to operate the starting-means for the transmitter when all of the signaling-devices have been operated, substantially as described.

16. In a watchman's signal-system, the combination of a signaling-circuit connected with a central-station, a code-signal-transmitter arranged to send signals over said circuit, having a starting-device, another circuit having signaling-devices at signal-stations, route-switch mechanism having a plurality of switches, an operating-magnet therefor, the circuit of which is controlled by said signaling-devices, the switches of said route-switch mechanism operating successively to disconnect said operating magnet from the circuit of the signal-station being operated, and to connect it in circuit with the next signal-station to be operated, in a prescribed order, and means, operated by said route-switch mechanism, when operated by the signaling-devices of all the signal-stations, arranged to operate the starting-device of said transmitter, substantially as described.

17. In a watchman's signal-system, the combination of a signaling-circuit connected with a central station, a code-signal-transmitter arranged to send signals over said circuit, having a starting-device, another circuit having signaling-devices at signal-stations, route-switch mechanism having a plurality of switches, an operating-magnet therefor, the circuit of which is controlled by said signaling-devices, the switches of said route-switch mechanism operating successively to disconnect said operating-magnet from the circuit of the signal-station being operated, and to connect it in circuit with the next signal-station to be operated, in a prescribed order, and a circuit-closer for the circuit of the starting magnet of said transmitter, adapted to be operated by said route-switch mechanism, substantially as described.

18. In a watchman's signal-system, the combination of a signaling-circuit connected with a central-station, a code-signal transmitter arranged to send signals over said circuit, having a starting-device, another circuit having signaling-devices at signal-stations, intermittingly-operated route-switch mechanism having a plurality of switches, means for operating it, controlled by the signaling-devices of all said signal-stations, and means, operated by said route-switch mechanism when all said signaling-devices have been operated, in a prescribed order, adapted to operate the starting-device of said transmitter, substantially as described.

19. In a watchman's signal-system, the combination of a signaling-circuit connected with a central-station, a code-signal-transmitter arranged to send signals over said circuit, having a starting-device, another circuit having signaling-devices at signal-stations and having relays corresponding in number to the number of signaling-devices, which are respectively responsive to the operations of said signaling-devices, route-switch mechanism having a plurality of switches, an operating-magnet therefor, a local-circuit for said operating-magnet controlled by the armatures of all said relays, the switches of said route-switch mechanism operating successively to place the operating-magnet successively under the control of the several relays, in a prescribed order, and means, operated by said route-switch mechanism when operated by all the signaling-devices, arranged to control the circuit of the starting-magnet of said transmitter, substantially as described.

20. In a watchman's signal-system, the combination of a signaling-circuit connected with a central-station, a code-signal-transmitter arranged to send signals over said circuit having a starting-device, another circuit having signaling-devices at signal-stations, an operating-magnet controlled by all said signaling-devices, a series of switches, and means, operated by said magnet, arranged to operate said switches successively, in a prescribed order, to thereby successively place the operating-magnet under the control of the several signaling-devices, and means also controlled by said magnet arranged to control the starting-device to start said transmitter, when all of the signaling-devices have been operated, substantially as described.

21. In a watchman's signal-system, the combination of a signaling-circuit connected with a central-station, a code-signal-transmitter arranged to send signals over said circuit having a starting-device, another circuit having signaling-devices at signal-stations, an operating-magnet controlled by all of said signaling-devices, a series of switches, a shaft having radially-extended arms adapted to operate the several switches successively, in a prescribed order, to successively place said magnet under the control of the several signaling-devices, a normally-wound train for rotating said shaft, the operation of which is controlled by said operating-magnet, and means operated by said train arranged to control the starting-device to start said transmitter when all of said signaling-devices have been operated, substantially as described.

22. In a watchman's signal-system, the combination of a signaling-circuit connected with a central-station, a code-signal-transmitter arranged to send signals over said circuit, having a starting-device, another circuit having signaling-devices at signal-stations, an operating-magnet controlled by all of said signaling-devices, a series of switches, and means operated by said magnet arranged to operate said switches successively, in a prescribed order, to thereby successively place the operating-magnet under the control of the several signaling-devices, a local circuit-controlling device for the starting-device of said transmitter, and means arranged to operate said local circuit-controlling device when all of said signaling devices have been operated, substantially as described.

23. In a watchman's signal-system, the combination of a signaling-circuit connected with a central-station, a code-signal-transmitter arranged to send signals over said circuit, having a starting-device, another circuit having signaling-devices at signal-stations and having relays corresponding in number to the number of signaling-devices which are respectively responsive to the operations of said signaling-devices, an operating-magnet controlled by all of said relays, a series of switches, and means operated by said magnet arranged to operate said switches successively, in a prescribed order, to thereby place the operating-magnet under the control of the several relays, and means controlled by said operating-magnet arranged to control the starting-device to start said transmitter when all of said signaling-devices have been operated, substantially as described.

24. In a watchman's signal-system, the combination of a signaling-circuit connected with a central-station, a code-signal transmitter arranged to send signals over said circuit, starting-means for said transmitter, another circuit having signaling-devices at signal-stations, a local recorder for the signals having operating-magnets corresponding to the several signal-stations and operated respectively by the signaling-devices at said stations, and means also operated by each signaling-device arranged to operate the starting-means of the transmitter when all said signaling-devices have been operated, substantially as described.

25. In a watchman's signal-system, the combination of a signaling-circuit connected with a central-station, a code-signal transmitter arranged to send signals over said circuit, starting-means for said signal-transmitter, another circuit having signaling-devices at signal-stations, a local recorder for the signals having operating-magnets corresponding to the several signal-stations and operated respectively by the signaling-devices at said stations, a switch-operating magnet adapted to be operated by all said signaling-devices, a plurality of switches controlled by said switch-operating magnet, arranged to include said magnet in circuit successively with the several signal-stations and with the several recorder operating-magnets, in a prescribed order, and means also operated by said switch-operating magnet arranged to operate the starting-means for the transmitter when all of the signaling-devices have been operated, substantially as described.

26. In a watchman's signal-system, the combination of a signaling-circuit connected with a central-station, a code-signal transmitter arranged to send signals over said circuit, starting-means for said transmitter, another circuit having signaling-devices at signal-stations, and having relays corresponding in number to the number of signaling-devices which are respectively responsive to the operations thereof, a local recorder for the signals, having operating-magnets corresponding to the several signaling-stations and controlled by the several relays, and means, also controlled by the relays, to operate the starting-means for the transmitter when all said signaling-devices have been operated, substantially as described.

27. In a watchman's signal-system, the combination of a group of signaling-devices, code-signal transmitting automatic means associated therewith and means to cause said signal-transmitting means to send a code signal when all of the signaling-devices of the group have been operated, substantially as described.

28. In a watchman's signal-system, the combination of a group of signaling-devices, code-signal transmitting-means associated therewith, means operated by the signaling-devices to cause said signal-transmitting-means to send a code-signal when all of the signaling-devices of the group have been operated, and a recorder located at a distant point and responsive to the operation of the signal-transmitting means to receive the code signal, substantially as described.

29. In a watchman's signal-system, the combination of a group of signaling-devices, code-signal transmitting means associated therewith, means operated by the signaling-devices, in a prescribed order, to cause said signal transmitting-means to send a code-signal when all of the signaling-devices of the group have been operated, and a recorder located at a distant point and responsive to the operation of the signal-transmitting means to receive the code signal, substantially as described.

30. In a watchman's signal-system, the combination of a group of signaling-devices, code-signal transmitting means associated therewith, and means operated by the signaling devices, in a prescribed order, to cause said signal-transmitting means to send a code-signal when all of the signaling-devices of the group have been operated, and a local recorder responsive to the operations of the several signaling-devices, substantially as described.

31. In a watchman's signal system, the combination of an electric circuit, a code-signal transmitter, a controlling-device which starts said transmitter when operated a number of times and which then resumes its normal position preparatory to being again operated, and signaling-devices at signal stations adapted to be operated by a watchman for operating said controlling-device a number of times to start the transmitter and to cause said controlling-device to resume its normal position, substantially as described.

32. In a watchman's signal system, the combination of an electric circuit, a code-signal transmitter, a controlling-device which operates to start said code-signal transmitter at the end of each cycle of its operation, and a plurality of signaling-devices to operate said controlling-device, the operation of said signaling-devices moving said controlling-device a complete cycle whereby the code-signal transmitter is started and the controlling-device restored to normal position preparatory to being again operated, substantially as described.

33. In a watchman's signal-system, the combination of an electric-circuit, a code-signal transmitter, a controlling-device operating to start said transmitter after it has been operated a number of times, and signaling-devices at signal-stations adapted to be operated by a watchman for repeatedly operating said controlling-device, whereby the code-signal transmitter will be started when all of the signaling-devices have been operated, substantially as described.

34. In a watchman's signal-system, the combination of an electric-circuit, a code-signal transmitter, a controlling-device operating to start said transmitter when operated a number of times, signaling-devices at signal-stations adapted to be operated by a watchman in a prescribed order, to repeatedly operate said controlling-device, whereby the code-signal transmitter will be started when all of the signaling-devices have been operated, substantially as described.

35. In a watchman's signal-system, the combination of an electric circuit, a code-signal transmitter, a controlling-device operated to start said transmitter when operated a number of times and to then resume its normal position, signaling-devices at signal stations adapted to be operated by a watchman in a prescribed order to repeatedly operate said controlling-device, whereby the code-signal transmitter will be started when all of the signaling-devices have been operated and the controlling-device will be returned to normal position, substantially as described.

36. In a watchman's signal-system, the combination of several groups of signaling-devices, signal-transmitting means associated with each group of signaling-devices, each adapted to send an identification-signal, and means to cause each signal-transmitting means to send its signal when all of the signaling-devices of the group associated therewith have been operated, substantially as described.

37. In a watchman's signal-system, the combination of a signaling-circuit connected with a central-station, a code-signal transmitter arranged to send signals over said circuit, a starting-magnet for said signal-transmitter, a circuit-controlling device for the circuit of said starting-magnet, signaling-devices at signal-stations and means controlled by said signaling-devices for momentarily operating said circuit-controlling device, a testing-magnet in circuit with said circuit-controlling device, and means controlled by its armature for permanently operating said circuit-controlling device, substantially as described.

38. In a watchman's signal-system, the combination of a signaling-circuit connected with a central-station, a code-signal transmitter arranged to send signals over said circuit, a starting-magnet for said signal-transmitter, a circuit-controlling device for the circuit of said starting-magnet, signaling-devices at signal-stations and means controlled by said signaling-devices for momentarily operating said circuit-controlling device, a testing magnet responsive to the operation of said circuit-controlling device, means controlled by its armature for permanently operating said circuit-controlling device, and means for restoring the means controlled by the testing-magnet and the circuit-controlling device to normal, substantially as described.

39. In a watchman's signal-system, the combination of a signaling-circuit connected with a central-station, a code-signal transmitter arranged to send signals over said circuit, a starting-magnet for said signal-transmitter, a circuit-controlling device for the circuit of said starting-magnet, a lever for operating said circuit-controlling device, signaling-devices at signal-stations, and means controlled by said signaling-devices for operating said lever, a testing-magnet in circuit with said circuit-controlling device, an armature therefor, and means controlled by said armature upon retraction to lock said lever in position with the circuit-controlling device closed, substantially as described.

40. In a watchman's signal-system, the combination of a signaling-circuit connected with a central-station, a code-signal transmitter arranged to send signals over said circuit, a starting-magnet for said signal-transmitter, a circuit-controlling device for the circuit of said starting-magnet, a lever for operating said circuit-controlling device, signaling-devices at signal-stations, means controlled by said signaling-devices for operating said lever, a testing-magnet in circuit with said circuit-controlling device, an armature therefor normally held in its attracted position by said lever, and adapted to move into retracted position and lock said lever when said lever is moved to close the circuit-controlling device and the testing-magnet is unable to hold its armature, substantially as described.

41. In a watchman's signal-system, the combination of a signaling-circuit connected with a central-station, a code-signal transmitter arranged to send signals over said circuit, starting-means for said code-signal transmitter, signaling-devices at signal-stations, and means controlled by said signaling-devices for operating said starting-means, a testing-magnet in the circuit and means controlled by its armature for controlling the operation of said starting-means and cause the signal-transmitter to send a different signal, substantially as described.

42. The combination of an electric-circuit, of a testing-magnet included therein, means for holding its armature in attracted position, means operated to close said circuit and to release said armature, and means controlled by said armature for sending a signal upon retraction thereof, substantially as described.

43. The combination of an electric-circuit, of a testing-magnet included therein, means operating to close said circuit and to place the armature of said magnet under the influence of the said magnet, and signal-transmitting means controlled by said armature upon retraction thereof, substantially as described.

44. The combination with an electric-circuit, of a testing-magnet included therein, means operating to close said circuit, and signal-transmitting means thereafter controlled by the armature of said magnet in case said armature occupies its retracted position after its circuit has been closed, substantially as described.

45. In a watchman's signal-system, the combination of a signaling-circuit connected with a central-station, code-signal transmitting means arranged to send signals over said circuit, starting-means for said code-signal transmitting means, signaling-devices at signal-stations, spring-operated mechanism controlled by said signal-devices to operate the starting-means for said code-signal transmitting means, and means operated by the expanding of the spring of said spring-operated mechanism for also operating said starting-means, substantially as described.

46. In a watchman's signal-system, the combination of a signaling-circuit connected with a central-station, code-signal transmitting means arranged to send signals over said circuits, starting-means for said code-signal transmitting means, signaling-devices at signal-stations, spring-operated mechanism controlled by said signaling-devices to momentarily operate the starting-means for said code-signal transmitting means, and means operated by the expanding of the spring of said spring-operated mechanism for permanently operating said starting-means, substantially as described.

47. In a watchman's signal-system, the combination of a signaling-circuit connected with a central-station, code-signal transmitting means arranged to send different signals over said circuit, starting-means for said code-signal transmitting means, signaling-devices at signal-stations, and spring-operated means controlled by said signaling-devices for operating said starting-means to cause the code-signal transmitting means to send a signal, means operated by the expanding of the spring of said spring-operated means for also operating said starting-means to cause the code-signal transmitting means to send a different signal, substantially as described.

48. In a watchman's signal-system, the combination of a signaling-circuit connected with a central-station, multiple code-signal transmitting means arranged to send different signals over said circuit, starting-means for said signal-transmitting means, a circuit having signaling-devices at signal-stations, and means controlled by said signaling-devices to momentarily operate said starting-means and cause the signal transmitting means to send a signal, and other means to permanently operate said starting-means, and cause the signal transmitting means to send a different signal, substantially as described.

49. In a watchman's signal-system, the combination of a signaling-circuit connected with a central-station, a code-signal transmitter arranged to send signals over said circuit, a starting-magnet for said signal-transmitter, a circuit controlling device for the circuit of said starting-magnet, signaling-devices at signal-stations, and means controlled by said signaling-devices to momentarily operate said circuit-controlling-device to cause the signal-transmitter to send a signal, and other means to permanently operate said circuit-controlling device to cause the signal-transmitter to send a different signal, substantially as described.

50. In a watchman's signal-system, the combination of a signaling-circuit connected with a central-station, a code-signal transmitter arranged to send signals over said circuit, a starting-magnet for said signal-transmitter, a circuit-controlling-device for the circuit of said starting-magnet, signaling-devices at signal-stations and means controlled by said signaling-devices to momentarily operate said circuit-controlling device to cause the signal-transmitter to send a signal, and a plurality of means to permanently operate said circuit-controlling device to cause the signal-transmitter to send a different signal, substantially as described.

In testimony whereof, I have signed my name to this specification, in the presence of two subscribing witnesses.

FREDERICK W. COLE.

Witnesses:
B. J. NOYES,
H. B. DAVIS.